United States Patent

[11] 3,620,735

[72] Inventor Bernard Ulano
Woodsburgh, N.Y.
[21] Appl. No. 645,488
[22] Filed June 12, 1967
[45] Patented Nov. 16, 1971
[73] Assignee Diagravure Film Mfg. Corp.
Brooklyn, N.Y.

[54] RELIEF IMAGE PROCESS UTILIZING A SIMPLE AND A COMPLEX FERRIC SALT
2 Claims, No Drawings

[52] U.S. Cl. .......... 96/36, 96/92, 96/36.4
[51] Int. Cl. .......... G03c 5/00
[50] Field of Search .......... 96/92, 33, 36.4, 36, 35.1

[56] References Cited

UNITED STATES PATENTS

| | | | |
|---|---|---|---|
| 2,927,021 | 3/1960 | Sorkin | 96/35 |
| 3,038,803 | 6/1962 | Kosar | 96/92 |
| 3,169,065 | 2/1965 | Sorkin et al. | 96/33 |

FOREIGN PATENTS

| | | | |
|---|---|---|---|
| 665,649 | 1/1952 | Great Britain | 96/92 |

OTHER REFERENCES

Kosar, Light-Sensitive Systems, 1965, pub. by John Wiley & Sons, Inc., page 30.

Remy, Treatise on Inorganic Chemistry, 1956, by Elsevier Publishing Co., page 280.

*Primary Examiner*—Norman G. Torchin
*Assistant Examiner*—Won H. Lowie, Jr.
*Attorney*—Pennie, Edmonds, Morton, Taylor and Adams

ABSTRACT: A photosensitive composition for making relief images and a process for utilizing said composition is provided. The composition comprises an insolublizable water-soluble binder, a water-soluble photosensitive simple ferric salt, for example, ferric chloride or ferric oxalate, and an inhibitor for the ferric salt, for example, ammonium, sodium, potassium or lithium oxalates, ammonium ferric oxalate or tartrate.

RELIEF IMAGE PROCESS UTILIZING A SIMPLE AND A COMPLEX FERRIC SALT

BACKGROUND OF THE INVENTION

1. Field of the Invention

The invention relates to the general field of printing, lithography, stencils and screen printing. It includes a light-sensitive system based on the use of water-soluble film-forming binder which is hardenable to a water-insoluble state. Suitable binders include gelatin, polyvinyl alcohol and the like. Furthermore, the present invention includes the use of photosensitive simple ferric salts, and inhibitors for these ferric salts.

2. Description of the Prior Art

The prior art is described in connection with several United States Patents and one British patent.

U.S. Patent No. 2,413,630 issued to H. P. Husek on Dec. 31, 1946 discloses a process for producing iodine images. The process requires a suspension of at least one photosensitive ferric salt in a permeable, relatively water-insoluble carrier. The suspension is differentially exposed to light to reduce ferric ions to ferrous ions in the exposed areas. The unexposed ferric salt is removed from the suspension and converted into an oxidizing agent having a sufficient oxidation potential to release iodine from an iodide. The oxidizing agent is reacted with an iodide to form an iodine image complementary to the ferrous salt image.

British Patent 665,649 of the Autotype Company Limited discloses a photographic film and a process for producing stencils with the film. The film comprises a supported layer of gelatine containing a light-sensitive iron salt. Ferric ammonium oxalate is exemplified as the iron salt. The film is exposed through a photographic transparency, treated with oxidizing agent to oxidize the iron salt back to the ferric state in the areas where it had been reduced during exposure in the ferrous state, thereby tanning the gelatin in those areas, and washing away the soluble untanned gelatine with warm water to leave a hardened image of gelatine adhering to the base material. The gelatine image is pressed into contact with bolting silk or other similar mesh material, stretched upon a frame, and allowed to dry. Subsequently the base material is stripped from the gelatine image adhering to the silk or similar material.

Sorkin in U.S. Pat. No. 2,927,021 issued Mar. 1, 1960 discloses methods of producing a relief image. An aqueous solution of water-soluble polyvinyl alcohol, vinyl methyl ether-maleic anhydride copolymer, polycarboxylic acid, and at least one ferric ammonium salt is coated on a clean substrate and dried. The dried coating is then exposed to ultraviolet radiation through a mask and then developed with dilute hydrogen peroxide solution to insolublize the coating in areas struck by ultraviolet radiation. The soluble areas are then washed off. Ferric ammonium citrate is claimed as the ferric ammonium salt.

Oster et al. in U.S. Pat. No. 3,097,097 issued July 9, 1963 discloses photodegradable gels and methods of producing reliefs from the gels. The gels comprise a water-soluble polymer in gel form, reducible metallic ions, dissolved photoreducible dye, and a reducing agent. The polymer may be polyvinyl alcohol and the metallic ions may be ferric ions. The gel is irradiated with visible light to reduce the dye which in turn reduces the metallic ion thereby degrading the gel. The degraded gel is then removed from the unaffected gel.

Sorkin et al. in U.S. Pat. No. 3,169,065 issued Feb. 9, 1965 discloses methods for preparing a metal-surfaced printing plate. A metal plate is first prime-coated with a sublayer and then top-coated with a photosensitive layer. The photosensitive layer is exposed to light through a transparency and then is treated with oxidizer in the presence of a polycarboxylic acid to form hardened portions in the layer. Unexposed areas of the layer are removed to reveal the sublayer. An aqueous etching solution is applied uniformly to both the hardened and the uncovered portions to remove the sublayer in the uncovered areas and etch the metal plate in those areas. The hardened areas prevent removal of the sublayer and etching of the metal plate. The photosensitive layer may comprise polyvinyl alcohol and a ferric ammonium salt.

SUMMARY OF THE INVENTION

According to present invention, a simple ferric salt is combined with a hardenable binder and an inhibitor. Previously, a simple ferric salt could not be combined with a hardenable binder without causing coagulation, insoluble complex formation, precipitation, hardening or insolublization. The hardening or coagulation would occur immediately in some cases or upon drying of a layer coated with such a combination. In other cases, the coated layer would soon turn insoluble. In all cases, the composition had no practical shelf life or storage stability.

Now it has been unexpectedly found that certain inhibitors can prevent premature hardening, complexing or insolublization of the binding by the simple ferric salt. This permits the use of simple ferric salts which are more photosensitive than the complex or compound salts. Simple ferric salt according to this invention is defined as a chemical combination of a ferric ion with a single species of anion. Examples are ferric oxalate and ferric chloride. By contrast, complex ferric salts are combinations of ferric ions with anions and other cations or molecules. Examples of the latter are ammonium ferric oxalate, $(NH_4)_3FE\,(C_2O_4)_3$, and ammonium ferric tartrate.

Suitable binders include water-soluble hardenable film forming polymers such as polyvinyl alcohol and its known equivalents. Suitable inhibitors include ammonium oxalate, lithium oxalate, ammonium tartrate and ammonium ferric salts such as the oxalate, tartrate or citrate. Other water-soluble salts having a monovalent inorganic cation and an organic-radical-containing anion are suitable. Other suitable anions included succinates and gluconates.

The present invention is directed to a process for producing relief images and the like for various types of printing and includes a composition for use in this process. The composition comprises a water-soluble resin having the general characteristics and equivalency in the process and composition of water-soluble polyvinyl alcohol, a simple ferric salt such as ferric oxalate or any of the others previously mentioned, and an inhibitor such as ammonium oxalate or ammonium ferric oxalate. The solution may contain a plasticizer and a colorant. The simple ferric salt must be water-soluble and photosensitive. A complex ammonium ferric salt may be included in the composition as an inhibitor but is not required if another inhibitor salt is present. The inhibitor may be light sensitive, as in the case of ammonium ferric oxalate but its light sensitivity is insufficient to produce hardening of the resin layer by itself. On the other hand, it acts as an inhibitor with respect to the simple ferric salt in molar ratios of 0.5:1 to 2.5:1 so that there is no insolublization of the composition or layer until it is exposed and developed.

The reason for the inhibiting action of the complex salt or similar compound is unknown, but it is possible that the inhibitor chelates or complexes with the photosensitive component until it is "unchelated" by subsequent processing. In any case the compositions according to the present invention produce durable, flexible and light-fast images having excellent resolving capability.

As indicated above, the invention includes the forming of a light-sensitive layer from a composition comprising a stable water-soluble binder such as polyvinyl alcohol adapted to produce a flexible film, a simple ferric salt and an inhibiting compound. With these points in mind, it is an object of the invention to provide a new composition as such, in aqueous solution and in the form of a light-sensitive coated layer. The coated layer may be prepared by depositing the aqueous solution on a suitable support such as a dimensionally stable transparent polyester foil or sheet and subsequently evaporating the water. Alternatively an aqueous solution of the simple photosensitive ferric salt and the inhibitor may be deposited on a dry layer of hardenable polymer and allowed to soak into the layer. After the water evaporates, a light-sensitive layer is obtained as before.

A further object of the invention is to provide a light-sensitive system including a light-sensitive film for use in various types of printing as mentioned above, and further produce a porous film which may be employed as a filter or light screen.

It is also an object of the invention to produce a light-sensitive film for stencils and screen-printing systems and a film which be durable and produce large numbers of copies, particularly in the case of stencils.

Another object is to provide a method of making positive or negative relief images from the same photosensitive layer and a single transparency.

DESCRIPTION OF PREFERRED EMBODIMENTS AND EXAMPLES

The process according to the invention includes a number of steps common to present practice, including the formation of a light-sensitive water-soluble polymer solution used for forming a layer on the desired support. The dry layer may be stored or used immediately. It is used by exposing to actinic light through a transparency and thereafter developed in a negative-working process or a positive-working process. In the negative-working process, the development is effected by immersing the exposed film in hydrogen peroxide solution or any suitable per compound such as sodium perborate. For the positive-working process, exposed films are developed in alkaline solutions, such as 10 percent monoethanolamine or 3 percent ammonium hydroxide. After development the soluble areas of the film are washed out with water, which may be cold or warm. In the negative-working process, the unexposed portions of the layer are washed out leaving the exposed portions. In the positive-working process, exposed portions of the layer are washed out, leaving the unexposed portions. The remaining relief image and support may be used in the known ways of silk screen printing and the other types of printing and stenciling referred to above.

The process of the invention involves certain technical procedures for producing specific effects and results, all of which will be described hereinafter in connection with certain of the following examples, it being understood that the provision of these samples is not intended to limit the scope of the invention.

EXAMPLE I

A coating solution was made up of the following materials in parts by weight.

| | |
|---|---|
| Water | 182.5 parts |
| Polyvinyl alcohol | 17.5 parts |
| Glycerine | 5.0 parts |
| Ammonium Ferric oxalate | 4.5 parts |
| Ferric oxalate | 2.0 parts |
| 3% Blue dye solution | 6.0 parts |

A solution was prepared according to the above formula and coated on a transparent film support. After drying, a portion of the film with the coated layer was exposed through the support to a pattern of actinic radiation from a 75 amp. carbon arc for 3.5 minutes at a distance of 3 feet. The layer was then developed in an acidic oxidizing solution of citric acid and 1.5 percent $H_2oo_2$ and subsequently washed with warm water. The unexposed areas of the layer washed away while the insolubilized exposed areas remained. A relief image or pattern 0.3 mil thick was thus produced. This was adhered to a stretched fabric screen to produce a durable flexible stencil.

EXAMPLE II

A solution was made from the following:

| | | |
|---|---|---|
| Water | 151.75 | lb. |
| Polyvinyl alcohol | 8.75 | lb. |
| Blue dye | 132 | grams |
| Wetting agent | 4 | grams |
| Glycerine | 1.5 | lb. |
| Ammonium Ferric oxalate | 4.5 | lb. |
| Ferric oxalate | 3.0 | lb. |

The above solution was prepared and coated on a transparent polyester film support. After drying, the coating on a part of the coated film was exposed through the support to a pattern of actinic radiation as in example I. The coating was then developing in 1.5 percent hydrogen peroxide containing 18-g. citric acid per 500-cc. solution The coating was then washed with warm water to produce a good negative relief image.

EXAMPLE III

Formula: (In parts by weight)

| | |
|---|---|
| Water | 242.5 parts |
| Polyvinyl alcohol | 17.5 parts |
| Gylcerine | 5.0 parts |
| Blue pigment dispersion | 2.0 parts |
| Ferric chloride | 1.0 parts |
| Ammonium Ferric tartrate | 4.0 parts |

The above formula was used to make a solution having a pH of 1.6. The solution was coated on a transparent film support and then dried. The dried coating on a part of the film was exposed, developed and washed as in example II to produce a good negative relief image. The unexposed coating as well as those of the previous examples were stable and usable after 6 months. Some coatings were stable and usable after 14 months.

EXAMPLE IV

A solution was prepared from the following formula, in parts by weight.

| | |
|---|---|
| Water | 666.3 parts |
| Potassium Oxalate | 1.4 parts |
| Ferric Oxalate | 3.7 parts |
| Glycerine | 4.7 parts |
| Blue pigment dispersion | 5.3 parts |
| Polyvinyl alcohol | 46.7 parts |

The above formula was prepared and coated on some transparent film supports. When dried, a film was exposed, developed and washed as before to yield a negative image. When a developer of 10 percent monethanolamine was used on the coating of one of the exposed supports a good positive relief image obtained.

EXAMPLE V

A solution was made from the following materials:

| | |
|---|---|
| Water | 111 lb. 12 oz. |
| Lithium succinate | 87 grams |
| Oxalic acid | 1 oz. |
| Glycerine | 12 oz. |
| Blue pigment dispersion | 1.0 lb. |
| Polyvinyl alcohol | 8.75 lb. |
| Ferric oxalate | 315 grams |

The above solution was prepared and coated on a transparent film support. The dried coating was exposed, developed in an oxidizing solution, and washed to produce a negative relief image.

I claim:

1. a stable photosensitive composition for making a durable flexible relief image consisting essentially of a water soluble polymeric binder, which is hardenable to a water insoluble state, a water soluble photosensitive simple ferric salt, and a water soluble inhibiting salt having a monovalent inorganic cation and an organic-radical-containing anion, said inhibiting salt being present in sufficient proportion and having the property of inhibiting the action of the simple ferric salt until exposed to light radiation, wherein the simple ferric salt comprises a chemical combination of a ferric ion with a single species of anion such as ferric chloride and ferric oxalate, and wherein the water soluble inhibiting salt is adapted to inhibit the premature hardening, complexing or insolublizing of the binder by the simple ferric salt, said inhibiting said being selected from the group consisting of ammonium oxalate, lithium oxalate, lithium succinate, sodium gluconate, sodium oxalate, potassium oxalate, ammonium ferric oxalate, and ammonium ferric tartrate, and being present in the composition in a molar ratio of inhibiting salt to simple ferric salt ranging from 0.5 to 1 to 2.5 to 1.

2. The method of producing a stable light-sensitive supported layer from the composition of claim 1, comprising forming a layer of said composition on a support, exposing said layer to a pattern of actinic radiation, developing said exposed layer in one of an acidic oxidizing developer and in an alkaline developer to selectively insolublize respectively one of the exposed and unexposed portions of said layer, and removing the soluble portions of said layer with water to leave a durable flexible relief image.

* * * * *